April 18, 1961     E. SLAVIN     2,980,152
UNDERTABLE MOUNTING FOR PORTABLE POWER TOOL
Filed Sept. 25, 1957     2 Sheets-Sheet 1
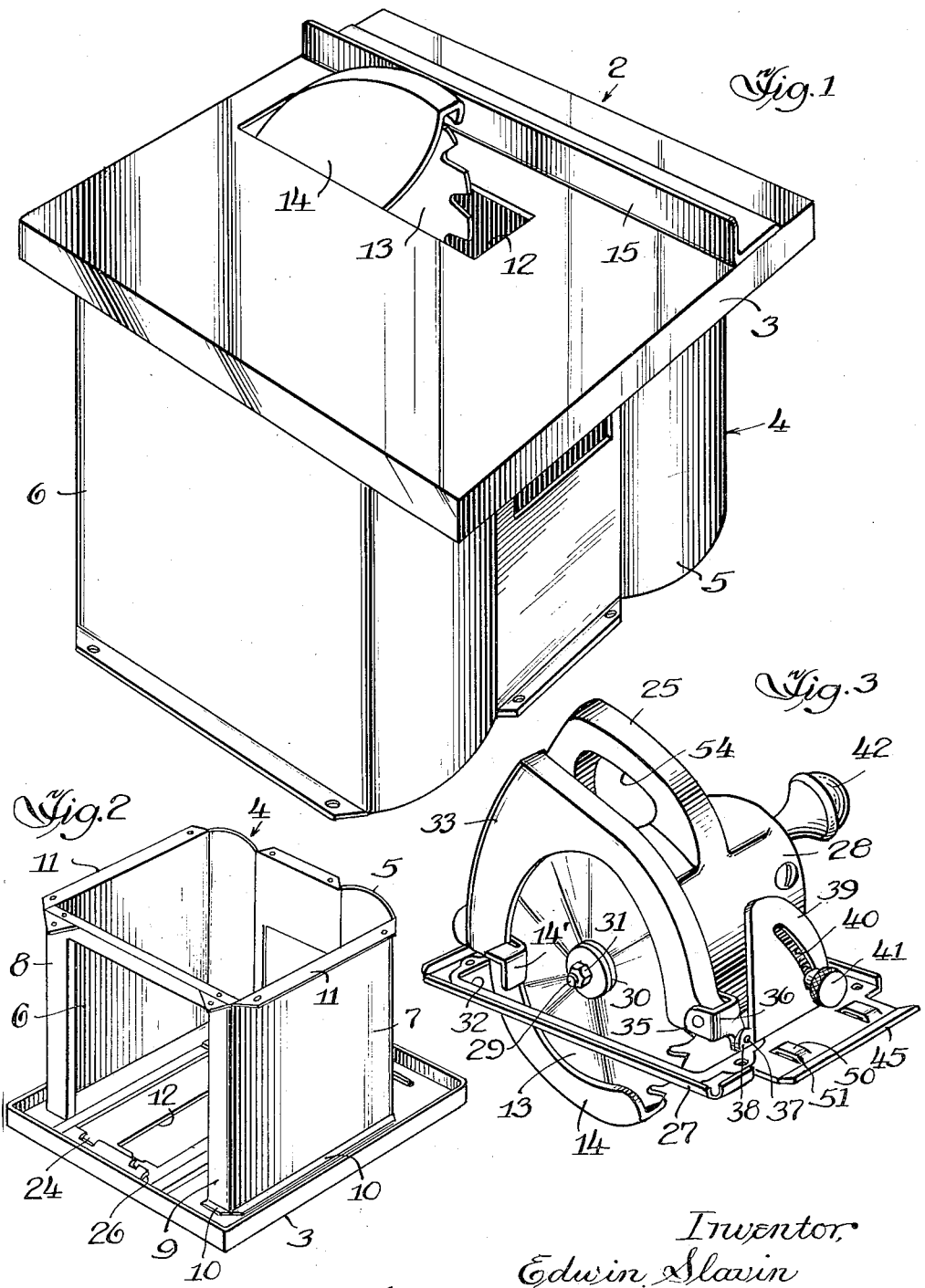

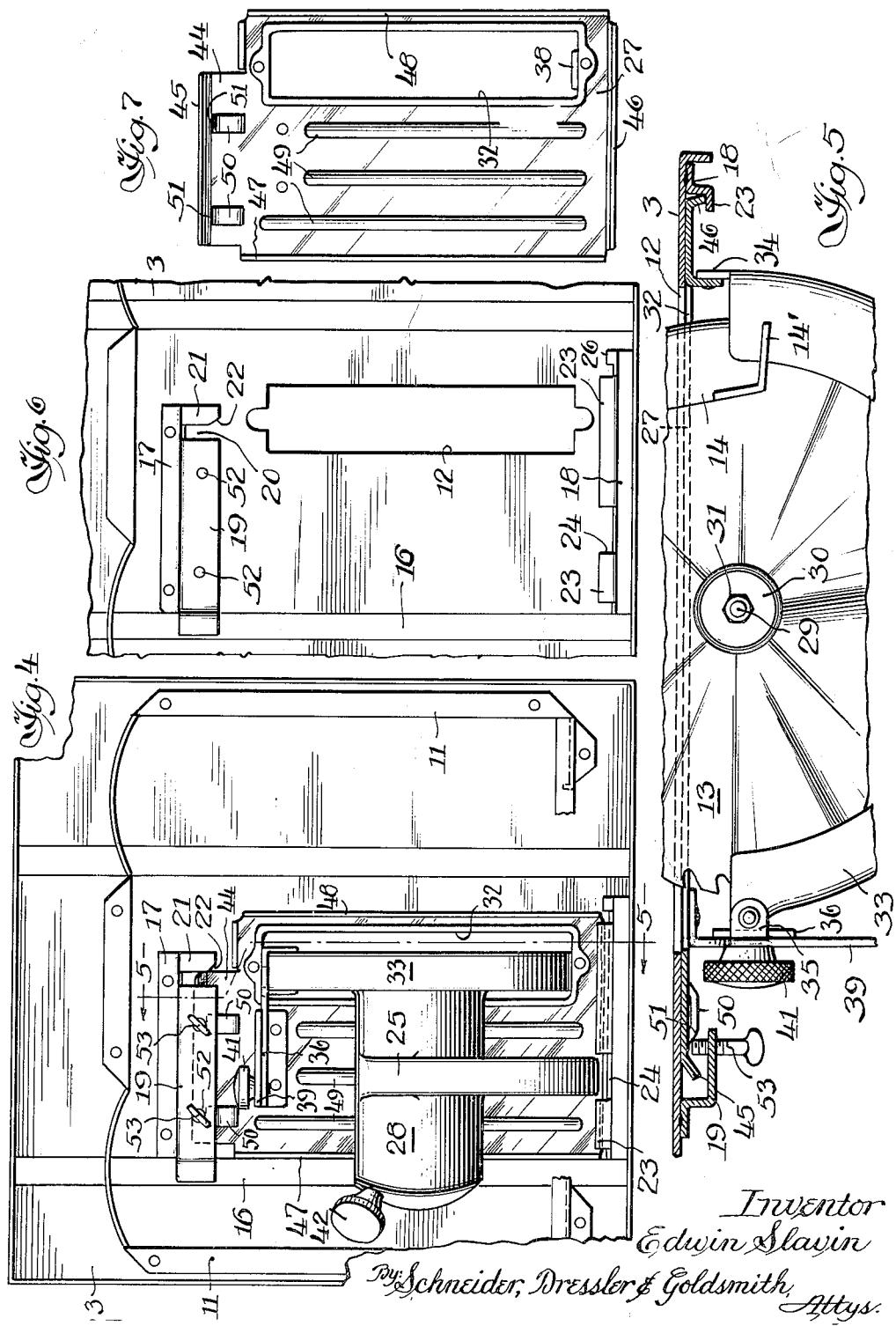

United States Patent Office 2,980,152
Patented Apr. 18, 1961

2,980,152

UNDERTABLE MOUNTING FOR PORTABLE POWER TOOL

Edwin Slavin, 630 Apple Tree Lane, Deerfield, Ill.

Filed Sept. 25, 1957, Ser. No. 686,112

6 Claims. (Cl. 143—132)

This invention relates to a mounting for a portable power tool, such as a power saw, and is particularly concerned with means for mounting a tool on the underside of a bench or table with a portion of the tool projecting through a slot for engaging a work piece on top of the bench or table.

Although the invention relates to a mounting for many different types of portable power tools to permit their use in fixed position relative to a work bench or table, the description, for convenience, will be limited to the mounting of a portable power saw.

The mounting structure embodying the present invention comprises a guide rail and a pair of flanges permanently secured to the underside of a table top. The top of the table is provided with an opening through which the saw blade projects when the saw is in operation. The saw has a small base plate permanently secured thereto. The base plate is adapted to be secured to the table by interengagement of the base plate with the guide rail and flanges on the underside of the table.

The mounting structure includes cam means for guiding the base plate of the saw into predetermined position on the underside of the table top. The base plate may be rigidly secured to the table top by screws that may be readily loosened to permit removal of the saw from its fixed position relative to the table. The screws that hold the saw in place do not project through the top of the table which presents a flat work surface contiguous to the saw blade.

The structure by means of which the above mentioned and other advantages of the invention are attained will be described in the following specification, taken in conjunction with the accompanying drawings, showing a preferred illustrative embodiment of the invention, in which:

Figure 1 is a perspective view of a table with the saw projecting through an opening in the table top in position for use;

Fig. 2 is an inverted perspective view showing the mounting means on the underside of the table;

Fig. 3 is an inverted perspective view of a portable power saw with the base plate secured thereto;

Fig. 4 is a bottom plan view, showing the portable power saw mounted on the underside of the table top;

Fig. 5 is a fragmentary cross sectional view, taken along the line 5—5 of Fig. 4;

Fig. 6 is a bottom plan view of the table top, showing the mounting means for securing the portable power saw to the underside of the table top; and Fig. 7 is a bottom plan view of the base plate to which the power saw is adapted to be permanently secured.

Referring to the drawings, the reference numeral 2 indicates a table comprising a top 3 and any suitable supporting structure 4. The supporting structure shown comprises a substantially closed front wall 5, and closed side walls 6 and 7. The back wall comprises two narrow strips 8 and 9 which may be bent from extensions of side walls 6 and 7, respectively. The strips 8 and 9 have a wide open space therebetween to permit movement of the saw therethrough when it is being attached to or removed from the mounting. The supporting walls are provided with flanges 10 adapted to be welded to the top 3, and other flanges 11 to facilitate securement of the table to a suitable supporting surface. The substantially closed supporting walls are preferred because of the safety afforded thereby, and also because of the appearance, but it will be obvious that the table top 3 can be supported on four vertical standards, if desired.

The table top 3 is provided with a longitudinally extending rectangular opening 12. The saw blade 13 and guard 14 project through the opening 12 when the saw is mounted on the underside of the table, as hereinafter described. Any suitable guide rail 15 may be adjustably mounted on the table top. The guide rail 15 may be moved laterally to regulate the distance between the saw blade and the edge of the material to be cut, or may be removed from the table top to provide an unobstructed smooth working surface.

A guide rail 16, (Figs. 4 and 6) extending longitudinally of the table, is welded to the underside of the table top 3. Transversely extending strips 17 and 18 are welded to the underside of the table top adjacent opposite ends thereof. One edge of the strip 17 is bent at right angles away from the underside of the table top, and is then bent a second time to provide a flange 19. A notch 20 spaces one end portion 21 of the flange 19 laterally from the rest of the flange. The second bend of the flange 19 is at right angles to the first bend to space the flange 19 from the underside of the table top in parallel relationship thereto along a major portion of the length of the strip 17.

The portion 21 of flange 19 which is positioned adjacent the end of strip 17 remote from the guide rail 16, has its free end positioned close to the underside of the table top 3. The edge of the portion 21 contiguous to the notch 20 is cut angularly, as indicated at 22, to provide a cam surface to facilitate proper positioning of the saw when it is mounted on the underside of the table top, in a manner hereinafter described.

One edge of the strip 18 is bent twice at right angles to provide a flange 23 spaced from and in parallel relationship to the underside of the table top 3. The free ends of the flanges 19 and 23 extend toward each other. The flange 23 is notched, as indicated at 24, to provide clearance for the handle 25 of the saw. The end of the flange 23 remote from the guide rail 15 is bent toward the underside of the table top, as indicated at 26, to provide an abutment adapted to engage one corner of the base plate 27 of the saw when it is mounted on the underside of the table top.

The portable saw comprises a motor 28, an output shaft 29, and the saw blade 13 secured on the shaft by washers 30 and a nut 31 (Fig. 3). The saw blade projects through a rectangular opening 32 extending longitudinally of the base plate 27 and adapted to register with the opening 12 when the saw is mounted on the underside of table top 3. The portion of the saw blade on one side of the base plate is protected by the guard 14, and the portion on the opposite side of the base plate is protected by a guard 33 rigidly secured to the housing of motor 28.

The portion of the saw blade which engages the work piece, regardless of whether the saw is used as a portable saw or is mounted under the table top, is the portion exposed between the base plate 27 and the guard 14. The guard 14 is retractible as the work piece advances in contact with the forward edge of the guard. The rear end of the guard 14 is provided with an extension 14' (Fig. 5) engaging the adjacent end portion of the guard 33 and having a portion extending within the guard 33 to guide the guard 14 in its retracting movement. A spring (not shown) concealed within the guard 33 has one end secured to the guard 33 and its other end secured to the extension 14'. The spring is stretched whenever the guard 14 is retracted and exerts a constant pressure against the extension 14' to move the guard 14 back to its normal position when it is released from the pressure of the work piece.

One end of the guard 33 is pivotally secured to the base plate 27, as indicated at 34. The opposite end of the guard 33 is rigidly secured between two arms 35 bent inwardly from a flat bar 36 pivotally secured, as indicated at 37 (Fig. 3) to a lug 38 welded to the base plate 27. The flat bar 36 extends transversely of the base plate at right angles thereto.

A plate 39 parallel to the flat bar 36 is welded to the base plate 27. The plate 39 is provided with an arcuate slot 40 adjacent the end of the flat bar 36 remote from the pivot 37. A screw 41 extending through the slot 40 has its end threaded in an aperture (not shown) in the flat bar 36. A knob 42, rigidly secured to the motor housing, facilitates angular movement of the saw about the pivots 34 and 37 when the saw is to be used in an angular position. The screw 41 may be loosened to permit angular movement to any desired position, and then tightened to hold it in said position.

The base plate 27 is provided at one end with an extension 44 having a flange 45. The opposite end of the base plate is provided with a flange 46 and the sides have flanges 47 and 48. The flanges 45, 46, 47 and 48 add rigidity to the base plate. Additional rigidity is provided by longitudinal ribs 49 (Fig. 7) in the base plate. Two closed loops 50 are struck from the base plate at right angles to the flange 45 and each presents a sloping surface 51 adjacent the flange.

When the saw is to be mounted on the underside of the table top, the base plate 27 is moved toward the underside of the table top to project a portion of the saw blade and the guard 14 through the opening 12. The base plate is then moved longitudinally to position the extension 44 and flange 45 under the flange 19. The saw cannot be positioned improperly because the saw blade can project through the opening 12 only when the saw is properly aligned with the table top. As the extension 44 is moved under the flange 19, the edge of the extension engages the angular edge 22 of the flange which acts as a cam to move the base plate 27 laterally until the flange 47 abuts the guide rail 16.

The flange 19 is provided with two apertures 52 which are in registration with the loops 50 when the flange 47 abuts the guide rail 16. As the base plate 27 is pushed toward the flange 19 and into face to face relationship with the underside of the table top 3, it is automatically moved laterally into abutment with the guide rail 16 by contact with the angular edge 22 of the flange 19. It is then moved toward the flange 23 to position the flange 46 between the flange 23 and the table top 3. In this position the flange 45 is between the flange 19 and the table top 3.

The base plate 27 is then secured in place by screwing a pair of wing screws 53 through the apertures 52 and tightening them against the loops 50. The screws 53 engage the sloping surfaces 51 which act as cams to push the base plate 27 toward the flange 23 until the flange 46 abuts the vertical portion of the flange 23. In this position the flange 23 engages the flange 46 to hold one end of the base plate from vertical movement, and the screws are tightened against the loops 50 to hold the other end of the base plate in position against the underside of the table top 3.

When the saw is to be removed from the table top, the screws 53 are loosened and the base plate 27 is moved longitudinally, to move the flange 46 clear of the flange 23. The saw is then tilted and pulled longitudinally until the flange 45 is clear of the flange 19 and the saw and base plate may be moved away from the table top.

The handle 25 is provided with a hand hole 54 to facilitate gripping it for carrying purposes, or for manipulating the saw when it is used as a portable saw. A trigger switch (not shown) projects into the hand hole 54 to control the operation of the motor 28.

While I have described a preferred embodiment of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. In combination with a portable tool secured to a base plate, a table top having a longitudinally extending opening extending therethrough and a pair of longitudinally spaced flanges rigidly secured to the underside of said table top, said flanges extending transversely of said table top and having inturned edges spaced from the underside of said table top, one end of said base plate being receivable between one of said inturned edges and the underside of said table top with an operative portion of said tool projecting through said opening in operative position above said table top, the other end of said base plate being engageable with said other inturned edge, a screw threaded through said first mentioned inturned edge into holding engagement with the first mentioned end of said base plate, and a cam engaging said screw to move said base plate longitudinally to position said second mentioned end of the base plate in holding engagement with said second mentioned inturned edge as said screw is threaded through said first mentioned inturned edge.

2. In combination with a portable tool secured to a base plate, a table top having a longitudinal opening extending therethrough, a pair of longitudinally spaced flanges rigidly secured to the underside of said table top, said flanges extending transversely of said table top and having inturned edges spaced from the table top, and a longitudinal guide rail secured to the underside of said table top, said guide rail traversing the space between the inner ends of said flanges, said base plate having an extension adapted to fit between one of said inturned edges and the underside of said table top with an operative portion of said tool projecting through said opening in operative position above said table top, means automatically guiding said base plate into abutment with said guide rail by moving said base plate transversely as said extension is moved into position between said one inturned edge and the underside of said table top, a screw threaded through said one inturned edge into holding engagement with said extension, and a cam on said base plate engaged by said screw as it is being threaded through said one inturned edge to move said base plate longitudinally to position the other end of said base plate in holding engagement with said other inturned edge.

3. In combination with a portable tool secured to a base plate, a table top having a longitudinal opening extending therethrough and a pair of longitudinally spaced flanges rigidly secured to the underside of said table top, said flanges extending tranversely of said table top and having inturned edges spaced from the table top, said base having an extension adapted to fit between one of said edges and the underside of said table top with an operative portion of said tool projecting through said opening in operative position above said table top, a cam surface on said first mentioned edge engageable with one edge of said extension to guide said base plate into predetermined lateral position relative to said table top by moving said base plate transversely as said extension is moved into position between said first mentioned edge and the underside of said table top, the end of said base plate opposite said extension then being engageable with said other inturned edge to hold said second mentioned end of the base plate against vertical displacement, a screw threaded through said first mentioned edge into holding engagement with said extension, and a cam on said base plate engaged by said screw to move said base plate longitudinally to position said second mentioned end of the base plate in holding engagement with said second mentioned inturned edge as said screw is threaded through said first mentioned edge.

4. In combination with a portable tool secured to a base plate, a table top having a longitudinal opening extending therethrough, a pair of longitudinally spaced flanges rigidly secured to the underside of said table top, said flanges extending transversely of said table top and having inturned edges spaced from the table top, and a longitudinal guide rail secured to the underside of said table top, said guide rail transversing the space between the inner ends of said flanges, one of said inturned edges having a notch therein, said base plate having an extension adapted to fit between said one edge and the underside of said table top with an operative portion of said tool projecting through said opening in operative position above said table top, said one edge adjacent said notch being cut angularly and engageable with one edge of said extension to guide said base plate into abutment with said guide rail by moving said base plate transversely as said extension is moved into position between said first mentioned edge and the underside of said table top, the end of said base plate opposite said extension being engageable with said other inturned edge to hold said last mentioned end of the base plate against vertical displacement, a screw threaded through said first mentioned edge into holding engagement with said extension, and a cam engaging said screw as it is threaded through said first mentioned edge to move said base plate longitudinally and thereby position said second mentioned end of the base plate in holding engagement with said second mentioned inturned edge.

5. In combination with a portable tool secured to a base plate, a table top having a longitudinal opening extending therethrough and a pair of longitudinally spaced flanges rigidly secured to the underside of said table top, said flanges extending transversely of said table top and having inturned edges spaced from the table top, said base plate having an extension adapted to fit between one of said edges and the underside of said table top with an operating portion of said tool projecting through said opening in operative position above said table top, a cam surface engageable with one edge of said extension to guide said base plate into predetermined lateral position relative to said table top by moving said base plate transversely as said extension is moved into position between said first mentioned edge and the underside of said table top, the end of said base plate opposite said extension being engageable with said other inturned edge to hold said last mentioned end of the base plate against vertical displacement, means for holding said first mentioned edge in engagement with said extension, said means being operable, as it is moved into holding position, to move said base plate longitudinally relative to said table top, to thereby position said second mentioned end of the base plate in holding engagement with said second mentioned inturned edge.

6. In combination with a portable saw secured to a base plate, a table top having a longitudinal opening, a longitudinal guide rail and a pair of longitudinally spaced flanges, each of said flanges extending transversely of said table top and having inturned edges spaced from the underside of said table top, one end of said base plate being adapted to fit between one of said edges and the underside of said table top with the saw positioned in said opening, a cam surface engageable with one edge of said base plate to guide said base plate into abutment with said guide rail by moving said base plate transversely as said one end of the base plate is moved into position between said first mentioned edge and the underside of said table top, the other end of said base plate being engageable with said other inturned edge to hold said second mentioned end of said base plate against vertical displacement, a screw threaded through said first mentioned edge into holding engagement with the first mentioned end of said base plate, and a cam engaging said screw to move said base plate longitudinally to position the second mentioned end of the base plate in holding engagement with said second mentioned inturned edge as said screw is threaded through said first mentioned edge.

References Cited in the file of this patent

UNITED STATES PATENTS

| | | |
|---|---|---|
| 984,237 | Osburn | Feb. 14, 1911 |
| 1,799,215 | Colby | Apr. 7, 1931 |
| 1,801,721 | Caldwell | Aug. 21, 1931 |
| 2,589,554 | Killian | Mar. 18, 1952 |
| 2,767,747 | Burrows | Oct. 23, 1956 |
| 2,810,412 | Roug | Oct. 22, 1957 |